US006307684B1

(12) United States Patent
Iyama

(10) Patent No.: US 6,307,684 B1
(45) Date of Patent: *Oct. 23, 2001

(54) ZOOM LENS SYSTEM

(75) Inventor: Noriyuki Iyama, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/311,297

(22) Filed: May 14, 1999

(30) Foreign Application Priority Data

May 15, 1998 (JP) .................................................. 10-150814

(51) Int. Cl.⁷ ...................................................... G02B 15/14
(52) U.S. Cl. ............................ 359/689; 359/676; 359/683
(58) Field of Search .................................... 359/676, 683, 359/687, 689

(56) References Cited

U.S. PATENT DOCUMENTS

| 5,325,235 | 6/1994 | Takashima et al. | 359/689 |
| 5,715,096 | 2/1998 | Meyers | 359/689 |
| 5,726,810 | 3/1998 | Meyers | 359/684 |
| 5,731,914 | 3/1998 | Meyers | 359/742 |
| 5,751,485 | * 5/1998 | Suzuki | 359/557 |
| 5,777,799 | * 7/1998 | Miyauchi | 359/689 |
| 5,825,556 | 10/1998 | Meyers | 359/690 |
| 5,831,772 | * 11/1998 | Nishio et al. | 359/689 |
| 6,025,960 | * 2/2000 | Morooka | 359/689 |
| 6,064,531 | * 5/2000 | Ishii et al. | 359/689 |

FOREIGN PATENT DOCUMENTS

| 4-260016 | 9/1992 | (JP) | G02B/15/20 |
| 5-188296 | 7/1993 | (JP) | G02B/15/20 |

* cited by examiner

Primary Examiner—Georgia Epps
Assistant Examiner—David N. Spector
(74) Attorney, Agent, or Firm—Pillsbury Madison & Sutro LLP

(57) ABSTRACT

A zoom lens system for compact cameras comprising a first positive lens unit, a second positive lens unit and a third negative lens unit: the first lens unit comprising at least a positive lens component which is disposed on the object side, and a negative meniscus lens component which is disposed on the image side of the positive lens component and has a concave surface on the image side. The zoom lens system is configured to perform zooming by varying an airspace reserved between the first lens unit and the second lens unit as well as an airspace reserved between the second lens unit and the third lens unit, and has a high zoom ratio and high optical performance.

26 Claims, 5 Drawing Sheets

6,307,684 B1

ZOOM LENS SYSTEM

BACKGROUND OF THE INVENTION a) Field of the Invention

The present invention relates to a zoom lens system, and more specifically a zoom lens system in particular for compact cameras.

b) Description of the Prior Art

As zoom lens systems for compact cameras, there are conventionally known zoom lens systems including one which consists of two lens units, i.e., a first positive lens unit and a second negative lens unit, and is configured to change a focal length by varying an airspace reserved between the two lens units, and another zoom lens system which consists of three lens units, i.e., a first positive lens unit, a second positive lens unit and a third negative lens unit, and is configured to change a focal length by varying airspaces reserved among the lens units.

Out of these zoom lens systems, the zoom lens system which consists of the two lens units permits not only simplifying a lens barrel structure and a drive mechanism but also reducing a number of lens components to be used, thereby being more advantageous for lowering a manufacturing cost than the zoom lens system which consists of the three lens units. On the other hand, the zoom lens system which consists of the three lens units is more excellent in that it can be configured to have a zoom ratio as high as possible and be compact as a whole.

Lens system disclosed by Japanese Patents Kokai Publication No. Hei 4-260016 and Kokai Publication No. Hei 5-188296 are known as conventional examples of zoom lens system which is configured to use lens elements in a minimum number to reduce a manufacturing cost. Out of these conventional examples, the former adopts a first positive lens unit which consists of a positive lens component, a second lens unit which consists of a negative lens component and a positive lens component, and a third lens unit which consists of a negative lens component. The latter zoom lens system adopts a first lens unit which consists of a negative lens component and a positive lens component, a second lens unit which consists of a negative lens component and a positive lens component, and a third lens unit which consists of a negative lens component.

To configure the zoom lens system which consists of the first positive lens unit, the second positive lens unit and the third negative lens unit so as to have a higher zoom ratio and more compact design, it is sufficient to strengthen a refractive power of each of the lens components by shortening a radius of curvature on each lens surface. In such a case, however, aberrations are produced in larger amounts and remarkably varied during zooming. To reduce variations of aberrations during zooming so as to obtain aberrations favorably corrected in an entire zooming region and a sufficiently high vari-focal ratio, each of the lens units must be composed of a larger number of lens components and the zoom lens system is inevitably enlarged as a whole. Furthermore, it becomes more difficult to manufacture the zoom lens system at a low cost as it is composed of a larger number of lens components. When a refractive power of each of the lens component is weakened to reduce variations of aberrations during a change of a magnification, the lens units must be moved for longer distances for changing a magnification, thereby making it impossible to configure the zoom lens system compact.

Furthermore, the zoom lens system which consists of the three lens units described above produces positive spherical aberration and aggravates longitudinal chromatic aberration at a tele position since the third lens unit has a strong negative refractive power. Furthermore, the zoom lens system produces positive distortion in a larger amount and aggravates coma at a wide position.

SUMMARY OF THE INVENTION

A primary object of the present invention is to provide a zoom lens system for compact cameras which has a high zoom ratio and high optical performance.

The zoom lens system according to the present invention comprises, in order from the object side, a first positive lens unit, a second positive lens unit and a third negative lens unit: the first lens unit comprising a positive lens component which is disposed on the object side, and a negative meniscus lens component which is disposed on the image side of the positive lens component and has a concave surface on the image side. The zoom lens system is configured to change a magnification from a wide position to a tele position by varying an airspace reserved between the first lens unit and the second lens unit as well as an airspace reserved between the second lens unit and the third lens unit.

BRIEF DESCRIPTION OF THE DRAWINGS

FIGS. 1A, 1B, 1C to 3A, 3B, 3C show sectional views illustrating compositions of first to third embodiments of the zoom lens system according to the present invention;

DESCRIPTION OF THE PREFERRED EMBODIMENTS

Figure 1A:
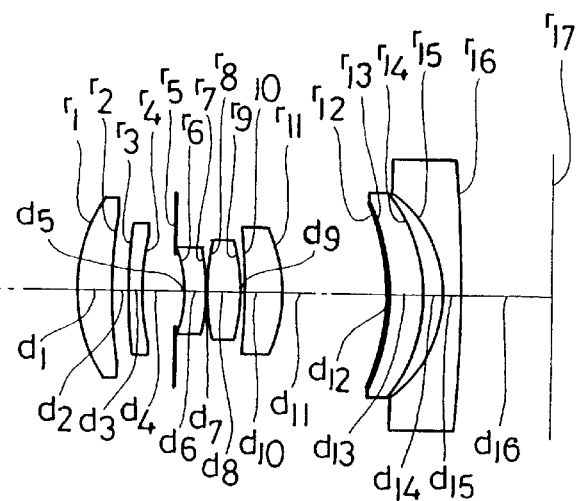
Figure 1B:
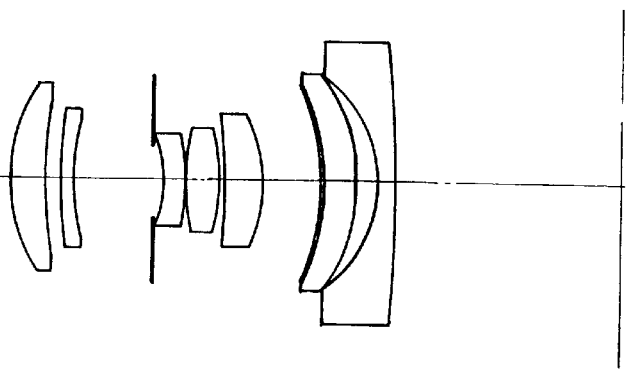
Figure 1C:
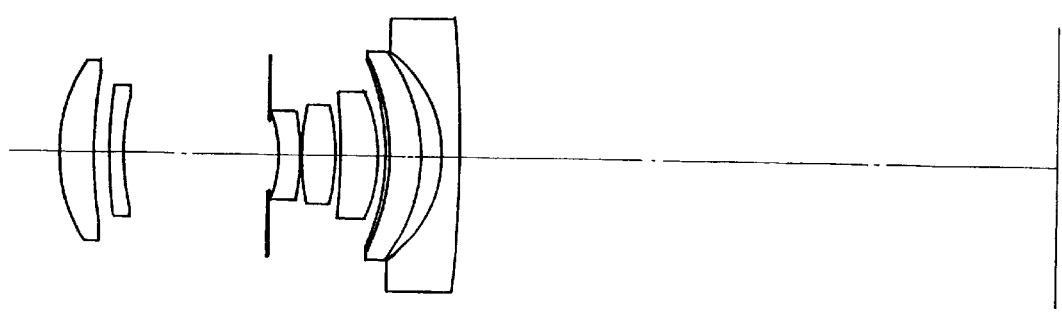
Figure 2A:
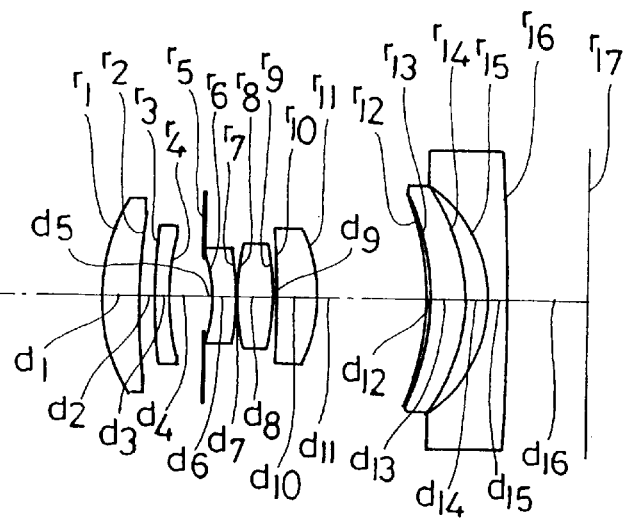
Figure 2B:
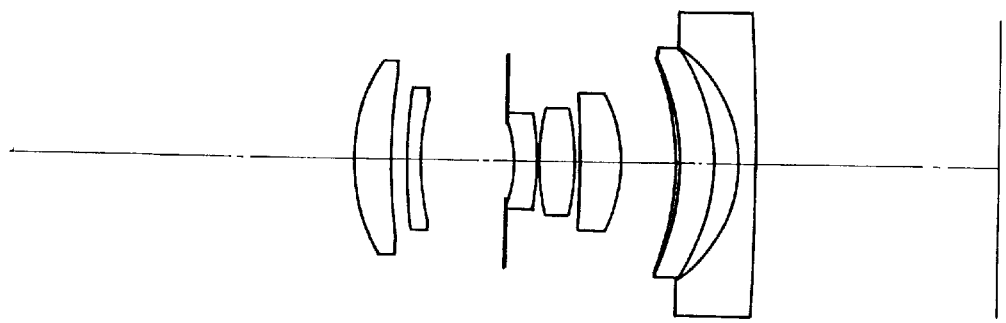
Figure 2C:
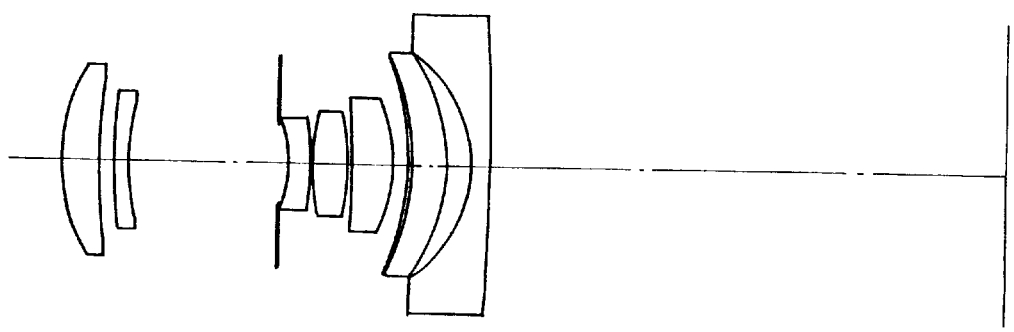
Figure 3A:
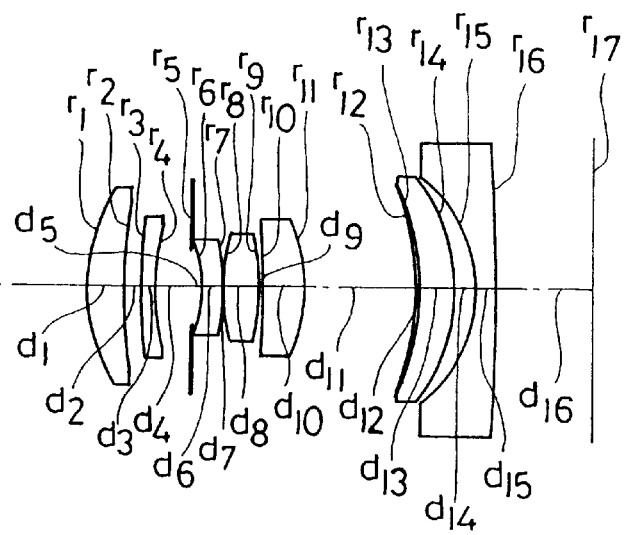
Figure 3B:
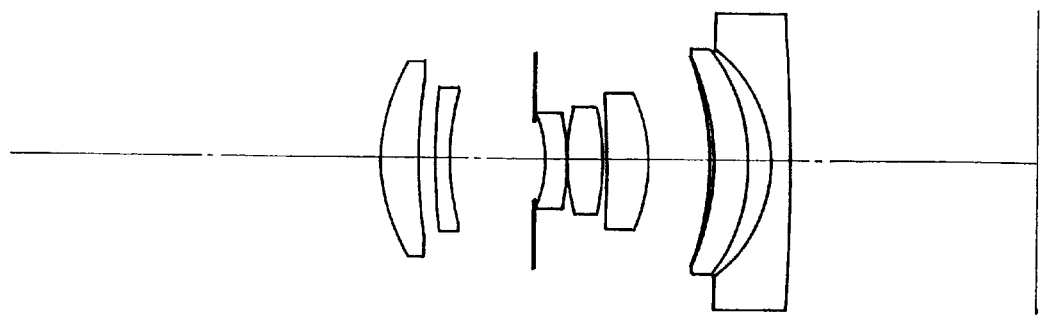
Figure 3C:
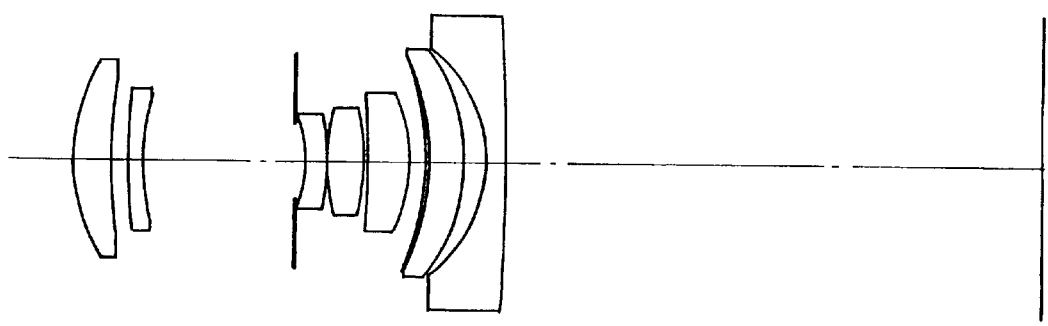

The zoom lens system according to the present invention is characterized in that it comprises a first positive lens unit, a second positive lens unit and a third negative lens unit in order from the object side, for example, as shown in FIG. 1, that the first lens unit comprises at least a positive lens component which is disposed on the object side and a negative lens component which is disposed on the image side of the positive lens component, and that the zoom lens system is configured to change a magnification from a wide position to a tele position by varying an airspace reserved between the first lens unit and the second lens unit as well as an airspace reserved between the second lens unit and the third lens unit.

In order to configure the zoom lens system comprising these three lens units so as to have a zoom ratio of 2 or higher, it is necessary to reduce a variation of chromatic aberration which is to be caused by changing the magnification.

In order to minimize longitudinal chromatic aberration to be produced by the first lens unit, the first lens unit is configured to comprise at least a positive lens component and at least a negative meniscus lens component as described above. By disposing at least a positive lens component and at least a negative lens component in the first lens unit, the zoom lens system is configured to allow the first lens unit to produce longitudinal chromatic aberration in a small amount so that chromatic aberration is corrected favorably in the zoom lens system as a whole and varied little.

The positive lens component is a positive lens element or a cemented lens component having a positive refractive power and the negative meniscus lens component is a negative meniscus lens element or a cemented lens component which has a negative refractive power and a meniscus shape.

In order to obtain high optical performance while maintaining a high vari-focal ratio not lower than 2.5 for the zoom lens system by configuring the first lens unit so as to produce aberrations in small amounts for favorable correction of aberrations in the zoom lens system as a whole, it is desirable to configure the negative lens component which is to be disposed on the image side of the positive lens component so as to have a meniscus shape which has a convex surface on the object side.

For the zoom lens system according to the present invention which has the composition described above, it is desirable to dispose the positive lens component and the negative lens component at locations adjacent to each is other with a predetermined airspace reserved therebetween. In other words, it is desirable no other lens component is disposed and only an airspace is reserved between the positive lens component and the negative lens component.

In order to reduce aberrations of offaxial incident rays in the zoom lens system according to the present invention, it is desirable that a first surface of the first lens unit is configured as a surface convex toward the object side so that the offaxial rays are incident on this surface at small angles of incidence. When the first lens unit is composed of a negative lens component and a positive lens component in order from the object side in this case, the negative lens component has a meniscus shape which has a high curvature on an image side surface thereof, thereby enhancing a cost for polishing and working the lens component.

When a first lens unit is composed of a positive lens component and a negative lens component in order from the object side as in the zoom lens system according to the present invention, however, the negative lens component can have a meniscus shape which has relatively low curvature on an image side surface, whereby the lens component can be easily be manufactured and provides an advantage from a viewpoint of a manufacturing cost.

For reduction of a manufacturing cost in particular of the zoom lens system according to the present invention, it is desirable to compose the first lens unit only of a positive lens component and a negative lens component.

For the zoom lens system according to the present invention which has any of the compositions described above, it is desirable to configure the positive lens component of the first lens unit so as to have an object side surface which is convex toward the object side.

Furthermore, it is more desirable that the positive lens component having the object side surface which is convex toward the object side is a positive meniscus lens component.

When the positive lens component of the first lens unit has the object side surface which is convex toward the object side, the object side surface refracts and converges rays coming from an object toward a side of an optical axis, thereby being capable of preventing a diameter of a front lens component from being enlarged.

When the positive lens component of the first lens unit is configured as a positive meniscus lens component having the object side surface which is convex toward the object side, the positive lens component has an image side surface which is concave toward the image side and a converging function for a light bundle which is converged by the object side surface is moderated by the image side surface, whereby an angle of incidence of a light bundle incident on the negative lens component disposed on the image side of the positive lens component is desirably reduced. Such reduction of an angle of incidence is effective to reduce amounts of aberrations to be produced.

It is desirable that the negative lens component of the first lens unit satisfies the following condition (1):

$$1<(r_{2F}+r_{2R})/(r_{2F}-r_{2R})<6 \qquad (1)$$

wherein the reference symbols $r_{2F}$ and $r_{2R}$ represent radii of curvature on the object side surface and the image side surface of the negative lens component of the first lens unit.

If the lower limit of 1 of the condition (1) is exceeded, the negative lens component will have a biconcave shape, whereby the offaxial rays will be incident on each surface of the first lens unit at large angles, and astigmatism and coma will undesirably be produced in large amounts. If the upper limit of 6 of the condition (1) is exceeded, in contrast, the negative lens component will have a meniscus shape which has high curvature, whereby the first lens unit will undesirably produce positive spherical aberration in a larger amount a the tele position.

Furthermore, curvature of field and positive distortion are apt to be aggravated at the wide position. It is desirable to correct the curvature of field and positive distortion which are aggravated at the wide position by utilizing curvature of field and distortion produced by surfaces of the positive lens component and the negative lens component which are opposed to each other in the first lens unit.

From a viewpoint of correction of aberrations in the zoom lens system according to the present invention, it is desirable to compose the second lens unit, in order from the object side, of an aperture stop, a negative meniscus lens component having an object side concave surface which has curvature higher than that of its image side convex surface and one or two positive lens components.

It is preferable to configure at least one of surfaces of the lens components to be disposed in the second lens unit as an aspherical surface which has such a shape as to strengthen a negative power as portions of the aspherical surface are farther from the optical axis since such as aspherical surface makes it possible to correct positive spherical surface makes it possible to correct positive spherical aberration and coma produced at the tele position.

For the zoom lens system according to the present invention, it is desirable to compose the third lens unit, in order from the object side, of a cemented lens component which consists of a lens element $L_a$ having a positive or negative refraction power and a lens element $L_b$ having a positive refractive power, and a negative lens component.

When a zoom lens system which consists, in order from the object side, of a first positive lens unit, a second positive lens unit and a third negative lens unit like the zoom lens system according to the present invention is to be configured so as to have a short total length while maintaining a high zoom ratio, it is required to strengthen refractive powers of the lens units, that of the third lens unit in particular, whereby positive distortion is produced in a large amount at a wide position and positive spherical aberration is produced in a large amount at a tele position. When the third lens unit is composed of three lens elements in such a case, functions to correct aberrations including those mentioned above can be shared among the lens components, thereby making it possible to correct aberrations. For this reason, the third lens unit of the zoom lens system according to the present invention is composed as described above.

Furthermore, it is desirable to configure at least one of surfaces in the third lens unit as an aspherical surface which has such a shape as to weaken a negative power as portions of the aspherical surface are farther from the optical axis. When such an aspherical surface is used in the third lens unit, it is possible to correct positive distortion at the wide position which is aggravated as the negative refractive power of the third lens unit is strengthened.

From viewpoints to facilitate to shape the aspherical surface (manufacture an aspherical lens part) and reduce a manufacturing cost, it is advantageous to select a resin material for an object side lens part of the cemented lens component in the third lens unit.

In this case, it is desirable to compose an image side lens part of a glass material. It is not preferable to compose both the lens elements of the cemented lens component of a resin material since such a material allows a refractive index and a shape of the cemented lens component to be adversely influenced remarkably due to variations of environmental conditions such as temperature and humidity.

For facilitating to shape the aspherical surface, it is desirable to use a resin material for the object side lens part of the cemented lens component and configure an object side surface of the object side lens part as an aspherical surface.

It is desirable to configure the object side aspherical surface so as to have such a shape as to weaken a negative power as portions of the aspherical surface are farther from the optical axis. When the object side surface is configured as such an aspherical surface, it is possible to correct positive distortion at the wide position which is aggravated as the negative refractive power of the third lens unit is strengthened. In this case, it is more effective to impart a negative refractive power to a portion of an image side lens part of the cemented lens component which is in the vicinity of the optical axis and to give a positive refractive power to a marginal portion of the image side lens part.

For correction of longitudinal chromatic aberration in the zoom lens system according to the present invention, it is desirable that the cemented lens component in the third lens unit satisfies the following condition (2):

$$-35 < v_{db} - v_{da} < -5 \tag{2}$$

wherein the reference symbols $v_{da}$ and $v_{da}$ represent Abbe's numbers of the object side lens part and the image side lens part respectively of the cemented lens component in the third lens unit.

The condition (2) has been adopted to favorably correct longitudinal chromatic aberration at the tele position which is aggravated as the refractive power of the third lens unit is strengthened. If the upper limit of −5 of the condition (2) is exceeded, it will be difficult to correct longitudinal chromatic aberration at the tele position in particular. If the lower limit of −35 of the condition (2) is exceeded, in contrast, it will be hard to obtain an adequate glass material.

It is more preferable to satisfy, in place of the condition (2), the following condition (2-1):

$$-30 < v_{db} - v_{da} < -10 \tag{2-1}$$

Furthermore, it is more desirable to satisfy, in place of the condition (2) or (2-1), the following condition (2-2).

$$-25 < v_{db} - v_{da} < -15 \tag{2-2}$$

Furthermore, it is desirable to use a resin material for the object side lens part of the cemented lens component in the third lens unit. In this case, it is desirable that the object side lens part made of the resin material satisfies the following condition (3):

$$|\phi_a|/\phi_T < 0.9 \tag{3}$$

wherein the reference symbol $\phi_a$ represents a refractive power of the object side lens part of the cemented lens component which is located on the optical axis and the reference symbol $\phi_T$ designates a refractive power of the zoom lens system as a whole at the tele position. When the lens part made of the resin material has an aspherical surface, its refractive power has a value which is calculated on the basis of a value of a surface having a radius of curvature on a standard surface on the optical axis (a reference sphere).

A lens element made of a resin material can be worked more easily than a lens element made of a glass material, but a refractive index and a shape of the former lens element are changed more remarkably than those of the latter lens element due to variations of environmental conditions such as temperature and humidity. As a result, an optical system which uses a lens element made of a resin material tends to allow its imaging performance and a back focal length to be varied due to the variations of the environmental conditions more remarkably than those of an optical system which uses a lens element made of a glass material. It is therefore preferable to weaken a refractive power of the lens element made of the resin material so as to reduce variations of optical performance of the optical system due to the variations of the environmental conditions.

If the upper limit of 0.9 of the condition (3) is exceeded, the refractive power and the shape of the object side lens element will be changed remarkably due to variations of environmental conditions such as temperature and humidity, thereby remarkably changing imaging performance of the optical system, a back focal length of the optical system at the tele position in particular.

To further reduce the change of the optical performance due to the variations of the environmental conditions, it is preferable to satisfy, in place of the condition (3), the following condition (3-1):

$$|\phi_a|/\phi_T < 0.8 \tag{3-1}$$

Furthermore, it is more desirable to satisfy, in place of the condition (3) or (3-1) the following condition (3-2):

$$|\phi_a|/\phi_T < 0.7 \tag{3-2}$$

When the object side lens element of the third lens unit in the third lens unit is made of a resin material in the zoom lens system according to the present invention, it is desirable to configure this lens element so as to satisfy the following condition (4):

$$0.8 < t_2/t_1 < 1.5 \tag{4}$$

wherein the reference symbol $t_1$ represents thickness of the lens element made of the resin material as measured on the optical axis and the reference symbol $t_2$ designates thickness of the lens element at a maximum height of a axial marginal ray at the tele position of the zoom lens system.

When the thickness of the lens element made of the resin material on the optical axis is made as equal as possible to the thickness at the maximum height of the axial marginal ray at the tele position, it is possible to reduce a variation of imaging performance of the zoom lens system at the tele position in particular regardless of a change of a shape of the lens element due to the variations of the environmental conditions such as temperature and humidity.

If the lower limit of 0.8 of the condition (4) is exceeded, the thickness of the lens element made of the resin material at the maximum height of the axial marginal ray at the tele position will be too small for its thickness on the optical axis, thereby allowing imaging performance to be lowered at the tele position in particular due to the variations of environmental conditions.

If the upper limit of 1.5 of the condition (4) is exceeded, in contrast, thickness of the lens element made of the resin material at the maximum height of the axial marginal ray will be too large for its thickness on the optical axis, thereby allowing the imaging performance to be lowered at the tele position in particular due to the variations of the environmental conditions.

For reducing the lowering of the imaging performance due to the variations of the environmental conditions, it is preferable to satisfy, in place of the condition (4), the following condition (4-1):

$$0.9 < t_2/t_1 < 1.4 \qquad (4\text{-}1)$$

Furthermore, it is more desirable to satisfy, in place of the condition (4-1), the following condition (4-2):

$$1.0 < t_2/t_1 < 1.3 \qquad (4\text{-}2)$$

Now, the preferred embodiments of the zoom lens system according to the present invention will be described in a form of numerical data:

Embodiment 1
f = 28.830~43.063~83.185,  F/4.85~6.77~11.74

$r_1 = 12.555$
  $d_1 = 2.63$    $n_1 = 1.72000$  $v_1 = 43.69$
$r_2 = 37.062$
  $d_2 = 1.12$
$r_3 = 42.992$
  $d_3 = 1.00$    $n_2 = 1.84666$  $v_2 = 23.78$
$r_4 = 16.991$
  $d_4 = D_1$ (variable)
$r_5 = \infty$ (stop)
  $d_5 = 0.64$
$r_6 = -10.437$
  $d_6 = 1.48$    $n_3 = 1.75500$  $v_3 = 52.32$
$r_7 = -30.788$
  $d_7 = 0.20$
$r_8 = 20.108$
  $d_8 = 2.41$    $n_4 = 1.48749$  $v_4 = 70.23$
$r_9 = -20.108$
  $d_9 = 0.36$
$r_{10} = -78.803$ (aspherical surface)
  $d_{10} = 2.88$    $n_5 = 1.56384$  $v_5 = 60.67$
$r_{11} = -11.171$
  $d_{11} = D_2$ (variable)
$r_{12} = -13.568$ (aspherical surface)
  $d_{12} = 0.30$    $n_6 = 1.52288$  $v_6 = 52.52$
$r_{13} = -16.864$ Embodiment 1
f = 28.830~43.063~83.185,  F/4.85~6.77~11.74

$d_{13} = 2.38$    $n_7 = 1.71736$  $v_7 = 29.51$
$r_{14} = -12.445$
  $d_{14} = 1.60$
$r_{15} = -9.750$
  $d_{15} = 1.28$    $n_8 = 1.72916$  $v_8 = 54.68$
$r_{16} = -148.857$
  $d_{16} = D_3$ (variable)
$r_{17} = \infty$ (image)

aspherical surface coefficients (10th surface)  $K = -0.311, A_4 = -3.27846 \times 10^{-4}$,
  $A_6 = 1.20306 \times 10^{-5}, A_8 = -1.48707 \times 10^{-6}$,
  $A_{10} = 6.31428 \times 10^{-8}$
(12th surface)  $K = 1.739, A_4 = 2.58469 \times 10^{-4}$,
  $A_6 = 2.95893 \times 10^{-6}, A_8 = -4.46409 \times 10^{-8}$,
  $A_{10} = 9.03587 \times 10^{-10}$

| | | | |
|---|---|---|---|
| f | 28.830 | 43.063 | 83.185 |
| F number | 4.85 | 6.77 | 11.74 |
| $D_1$ | 2.56 | 5.98 | 10.76 |
| $D_2$ | 7.62 | 4.22 | 0.47 |
| $D_3$ | 6.80 | 17.08 | 44.47 |

$(r_{2F} + r_{2R})/(r_{2F} - r_{2R}) = 2.30695, v_{db} - v_{da} = -22.99$
$\phi_a = 0.0073, \Phi_T = 0.012021, |\Phi_a|/\Phi_T = 0.60725$
$t_1 = 0.3, t_2 = 0.33128, t_2/t_1 = 1.10427$ Embodiment 2
f = 27.308~43.063~72.364, F/4.53~6.68~10.24

$r_1 = 12.595$
  $d_1 = 2.63$    $n_1 = 1.72000$  $v_1 = 43.69$
$r_2 = 36.942$
  $d_2 = 1.12$
$r_3 = 43.047$
  $d_3 = 1.00$    $n_2 = 1.84666$  $v_2 = 23.78$
$r_4 = 16.988$
  $d_4 = D_1$ (variable)
$r_5 = \infty$ (stop)
  $d_5 = 0.64$
$r_6 = -10.489$
  $d_6 = 1.49$    $n_3 = 1.75500$  $v_3 = 52.32$
$r_7 = -30.286$
  $d_7 = 0.21$
$r_8 = 19.885$
  $d_8 = 2.41$    $n_4 = 1.48749$  $v_4 = 70.23$
$r_9 = -19.797$
  $d_9 = 0.37$
$r_{10} = -83.248$ (aspherical surface)
  $d_{10} = 2.90$    $n_5 = 1.56384$  $v_5 = 60.67$
$r_{11} = -11.055$
  $d_{11} = D_2$ (variable)
$r_{12} = -13.377$ (aspherical surface)
  $d_{12} = 0.15$    $n_6 = 1.52288$  $v_6 = 52.50$
$r_{13} = -16.620$
  $d_{13} = 2.55$    $n_7 = 1.71736$  $v_7 = 29.Si$
$r_{14} = -12.597$
  $d_{14} = 1.60$
$r_{15} = -9.672$
  $d_{15} = 1.30$    $n_8 = 1.72916$  $v_8 = 54.68$
$r_{16} = -165.291$
  $d_{16} = D_3$ (variable)
$r_{17} = \infty$ (image)

aspherical surface coefficients (10th surface)  $K = -0.310, A_4 = 3.06687 \times 10^{-4}$,
  $A_6 = 5.89194 \times 10^{-6}, A_8 = 7.10315 \times 10^{-7}$,
  $A_{10} = 2.84264 \times 10^{-8}$
(12th surface)  $K = 0.524, A_4 = 1.96910 \times 10^{-4}$,
  $A_6 = 2.24386 \times 10^{-6}, A_8 = 3.06457 \times 10^{-8}$,
  $A_{10} = 3.63029 \times 10^{-10}$ -continued Embodiment 2
f = 27.308~43.063~72.364, F/4.53~6.68~10.24

| | | | |
|---|---|---|---|
| f | 27.308 | 43.063 | 72.364 |
| F number | 4.53 | 6.68 | 10.24 |
| $D_1$ | 2.57 | 5.99 | 10.63 |
| $D_2$ | 7.70 | 3.99 | 1.10 |
| $D_3$ | 5.80 | 17.21 | 36.36 |

$(r_{2F} + r_{2R})/(r_{2F} - r_{2R}) = 2.30381$, $v_{db} - v_{da} = -22.99$
$\Phi_a = 0.0075$, $\Phi_T = 0.013819$, $|\Phi_a|/\Phi_T = 0.54273$
$t_1 = 0.15$, $t_2 = 0.18179$, $t_2/t_1 = 1.21193$

Embodiment 3
f = 28.800~43.063~72.368, F/4.77~6.68~10.24

$r_1 = 12.441$
    $d_1 = 2.63$      $n_1 = 1.72000$   $v_1 = 43.69$
$r_2 = 36.685$
    $d_2 = 1.13$
$r_3 = 44.386$
    $d_3 = 1.00$      $n_2 = 1.84666$   $v_2 = 23.78$
$r_4 = 16.762$
    $d_4 = D_1$ (variable)
$r_5 = \infty$ (stop)
    $d_5 = 0.64$
$r_6 = -10.483$
    $d_6 = 1.42$      $n_3 = 1.75500$   $v_3 = 52.32$
$r_7 = -30.452$
    $d_7 = 0.17$
$r_8 = 19.991$
    $d_8 = 2.39$      $n_4 = 1.48749$   $v_4 = 70.23$
$r_9 = -20.011$
    $d_9 = 0.37$
$r_{10} = -79.420$ (aspherical surface)
    $d_{10} = 2.86$      $n_5 = 1.56384$   $v_5 = 60.67$
$r_{11} = -11.208$
    $d_{11} = D_2$ (variable)
$r_{12} = -13.855$ (aspherical surface)
    $d_{12} = 0.30$      $n_6 = 1.52288$   $v_6 = 52.50$
$r_{13} = -15.770$
    $d_{13} = 2.37$      $n_7 = 1.71736$   $v_7 = 29.51$
$r_{14} = -12.424$
    $d_{14} = 1.59$
$r_{15} = -9.790$
    $d_{15} = 1.29$      $n_8 = 1.72916$   $v_8 = 54.68$
$r_{16} = -142.861$
    $d_{16} = D_3$ (variable)
$r_{17} = \infty$ (image)

aspherical surface coefficients (10th surface)    $K = -0.309$, $A_4 = -3.06283 \times 10^{-4}$,
                 $A_6 = 8.10602 \times 10^{-6}$, $A_8 = -1.11498 \times 10^{-6}$,
                 $A_{10} = 5.42380 \times 10^{-6}$
(12th surface)    $K = 1.461$, $A_4 = 2.30810 \times 10^{-4}$,
                 $A_6 = 2.25470 \times 10^{-6}$, $A_8 = -2.68110 \times 10^{-6}$,
                 $A_{10} = 4.90210 \times 10^{-10}$

| | | | |
|---|---|---|---|
| f | 28.800 | 43.063 | 72.368 |
| F number | 4.77 | 6.68 | 10.24 |
| $D_1$ | 2.58 | 5.97 | 10.60 |
| $D_2$ | 7.67 | 4.22 | 1.10 |
| $D_3$ | 6.75 | 17.20 | 36.98 |

$(r_{2F} + r_{2R})/(r_{2F} - r_{2R}) = 2.21358$, $v_{db} - v_{da} = -22.99$
$\Phi_a = 0.0043$, $\Phi_T = 0.013818$, $|\Phi_a|/\Phi_T = 0.31118$
$t_1 = 0.3$, $t_2 = 0.31793$, $t_2/t_1 = 1.05977$ wherein the reference symbols $r_1, r_2, \ldots$ represent radii of curvature on surfaces of respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $v_1, v_2, \ldots$ represent Abbe's numbers of the respective lens elements.

The first to third embodiments are lens systems which have compositions illustrated in FIGS. 1A, 1B, 1C to 3A, 3B, 3C respectively: each comprising a first lens unit having a positive refractive power, a second lens unit having a positive refractive power and a third lens unit having a negative refractive power which are moved so as to widen an airspace reserved between the first lens unit and the second lens unit and narrow an airspace reserved between the second lens unit and the third lens unit for zooming the lens system from the wide position to the tele position. The third lens unit is moved toward the object side. The first lens unit comprises a positive meniscus lens component having a convex surface on the object side and a negative meniscus lens component, the second lens unit comprises an aperture stop, a negative meniscus lens component having a concave surface on the object side, a biconvex positive lens component and a positive meniscus lens component having a concave surface on the object side, and the third lens unit comprises a cemented lens component consisting of a lens element having a negative refractive power on the optical axis and a positive meniscus lens element having a concave surface on the object side, and a negative meniscus lens component having a concave surface on the object side. An object side surface ($r_{10}$) of the positive meniscus lens component disposed in the second lens unit and an object side surface ($r_{12}$) of the third lens unit are configured as aspherical surfaces. The object side lens element ($r_{12}$ to $r_{13}$) of the cemented lens component of the third lens unit is made of a resin material.

The aspherical surfaces used in the embodiments described above have shapes which are expressed by the following formula:

$$x = (y^2/r)\left/\left[1 + \{1 - (k+1)(y/r)^2\}^{1.2}\right]\right. + A_4 y^4 + A_6 y^6 + A_8 y^8 + A_{10} y^{10}$$

wherein a light travelling direction (an optical axis) is taken as the x axis, a direction perpendicular to the optical axis is taken as the y axis, the reference symbol r represents an axial radius of curvature (radius of curvature on the reference sphere), the reference symbol k designates a conical coefficient, and the reference symbols $A_4$, $A_6$, $A_8$ and $A_{10}$ denote aspherical surface coefficients of the fourth, sixth, eighth and tenth orders respectively.

As compared with photographing ranges in diagonal directions shown in FIGS. 1A, 1B, 1C, 2A, 2B, 2C and 3A, 3B, 3C illustrating the compositions of the embodiments, photographing ranges in directions of longer sides and shorter sides are narrow. Accordingly, a maximum height of ray on each of the lens component to be reduced in a size thereof, sides are narrow.

Figure 4A:
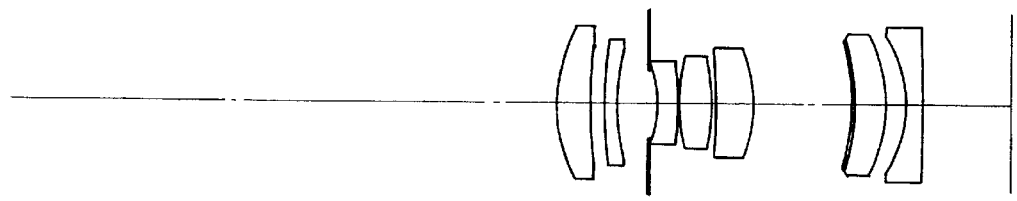
FIGS. 4A, 4B and 4C show sectional views taken in a direction along a shorter side of the first embodiment.
Figure 4B:
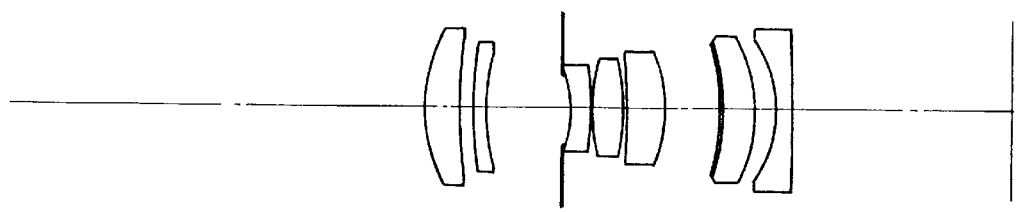
Figure 4C:
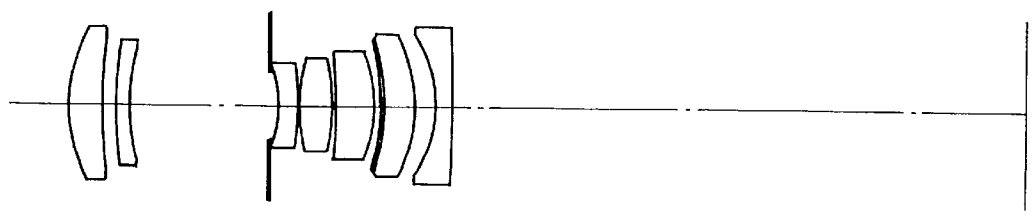

FIGS. 4A, 4B and 4C show sectional views in the direction of the shorter side of the first embodiment. The lens components of the first lens unit and the third lens unit in particular have sides which are shortened as compared with their diagonal lengths as shown in FIGS. 4A, 4B and 4C. The lens components which have such shortened sides makes it possible to configure a camera compact in a vertical direction.

Figure 5:
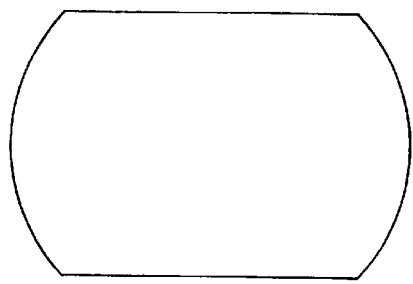
FIG. 5 shows a diagram illustrating a shape of the third lens unit when its length is shortened in a direction along the shorter side.

FIG. 5 is a front view of a lens component having a length which is shortened in a direction of the shorter side.

Figure 6:
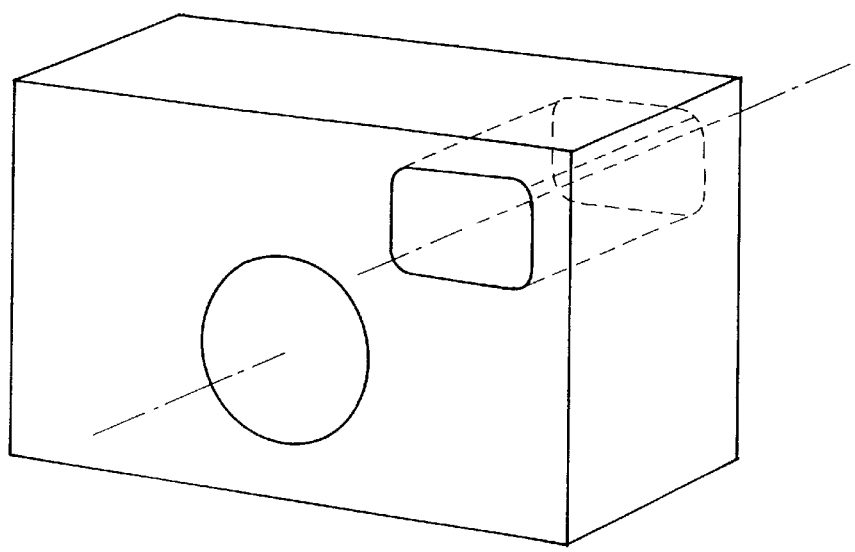
FIG. 6 shows a perspective view of a compact camera in which the zoom lens system according to the present invention is assembled.
Figure 7:
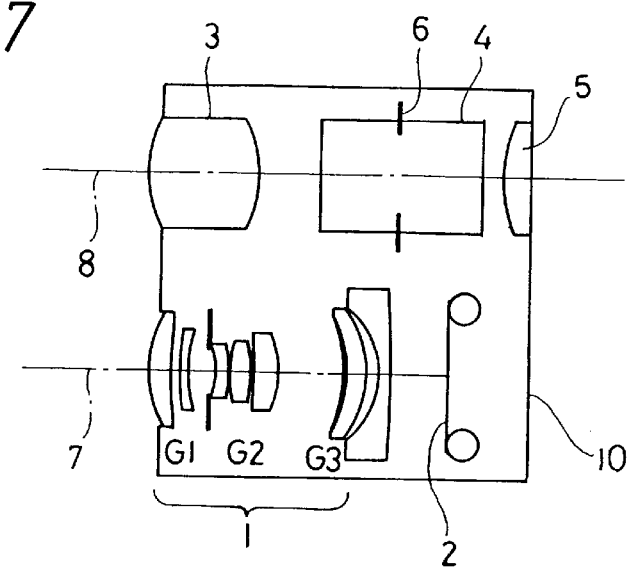
FIG. 7 shows a sectional view showing the compact camera in which the zoom lens system according to the present invention is assembled.

FIGS. 6 and 7 are a perspective view and a sectional view respectively illustrating a compact camera in which the zoom lens system according to the present invention is assembled as a photographic lens system.

In these drawings, a reference numeral 1 represents the zoom lens system according to the present invention (a photographic lens system) with comprises three lens units, i.e., a first lens unit $G_1$, a second is lens unit $G_2$ and a third lens unit $G_3$, and is set in a condition of the wide position of the first embodiment. A reference numeral 2 designates a film, a reference numeral 3 denotes an objective lens for a view finder, a reference numeral 4 represents an image erecting prism, a reference numeral 5 designates an eyepiece, a reference numeral 6 denotes a stop, and reference numerals 7 and 8 represent a photographing optical path and an optical path for the view finder respectively. Furthermore, a reference numeral 10 designates a camera body.

This camera is configured to dispose the photographing optical path in parallel with the optical path for the view finder as that an image of an object is observable through the view finder which is composed of the objective lens 3 for the view finder, the image erecting prism 4, the stop 6 and the eyepiece 6, and the image is formed and photographed on the film by the zoom lens system 1.

The present invention provides a zoom lens system comprising three positive, positive and negative lens units, wherein the first positive lens unit comprises a positive lens component, and a negative lens component which is disposed on the image side of the first lens unit and has a concave surface on the image side so as to obtain a zoom lens system for compact cameras which has a high vari-focal ratio and favorably corrected aberrations.

What is claimed is:

1. A zoom lens system comprising in order from an object side:

a first positive lens unit;

a second positive lens unit; and a third negative lens units;

wherein said first positive lens unit consists of a positive lens component which is disposed on the object side, and a negative meniscus lens component which is disposed on an image side of said positive lens component, and has a concave surface on the image side;

wherein a layer of air is reserved between the positive lens component and the negative meniscus lens component of said first lens unit; and wherein each of said first positive, second positive, and third negative lens units moves in the direction of the object side when the magnification of said zoom lens system is changed from a wide angle position to a telephoto position.

2. The zoom lens system according to claim 1, wherein the positive lens component of said first lens unit is a positive lens element.

3. The zoom lens system according to claim 1, wherein lens components which have powers in said first lens unit comprise a positive lens element and a negative lens element.

4. The zoom lens system according to claim 1, wherein said positive lens component of said first lens unit has a shape which has a convex surface on the object side.

5. The zoom lens system according to claim 2, wherein said positive lens component of said first lens unit has a shape which has a convex surface on the object side.

6. The zoom lens system according to claim 4, wherein said positive lens component has a meniscus shape.

7. The zoom lens system according to claim 1, wherein the negative lens component of said first lens unit satisfies the following condition (1):

$$1<(r_{2F}+r_{2R})/(r_{2F}-r_{2R})<6 \qquad (1)$$

wherein the reference symbols $r_{2F}$ and $r_{2R}$ represent radii of curvature on the object side surface and the image side surface of the negative lens component of the first lens unit.

8. The zoom lens system according to claim 2, wherein the negative lens component in said first lens unit satisfies the following condition (1):

$$1<(r_{2F}+r_{2R})/(r_{2F}-r_{2R})<6 \qquad (1)$$

wherein the reference symbols $r_{2F}$ and $r_{2R}$ represent radii of curvature on the object side surface and the image side surface of the negative lens component of the first lens unit.

9. The zoom lens system according to claim 4, wherein the negative lens component in said first lens unit satisfies the following condition (1):

$$1<(r_{2F}+r_{2R})/(r_{2F}-r_{2R})<6 \qquad (1)$$

wherein the reference symbols $r_{2F}$ and $r_{2R}$ represent radii of curvature on the object side surface and the image side surface of the negative lens component of the first lens unit.

10. A zoom lens system comprising in order from an object side:

a first positive lens unit;

a second positive lens unit; and a third negative lens unit, wherein said first positive lens unit comprises a positive lens component which is disposed on the object side, and a negative meniscus lens component which is disposed on an image side of said positive lens component and has a concave surface on the image side, and said second positive lens unit comprises, in order from the object side, an aperture stop, a negative meniscus lens component having a concave surface on the object side and two or a smaller number of positive lens components;

wherein a layer of air is reserved between the positive lens component and the negative meniscus lens component of said first lens unit; and wherein a magnification of said zoom lens system is changed from a wide position to a telephoto position by varying an airspace reserved between said first lens unit and said second lens unit as well as an airspace reserved between said second lens unit and said third lens unit.

11. A zoom lens system comprising in order from an object side:

a first positive lens unit;

a second positive lens unit; and a third negative lens unit, wherein said first positive lens unit comprises a positive lens component which is disposed on the object side, and a negative meniscus lens component which is disposed on an image side of said positive lens component and has a concave surface on the image side, and said second positive lens unit comprises, in order from the object side, an aperture stop, a negative meniscus lens component having a concave surface on the object side and two or a smaller number of positive lens components, wherein the positive lens component of said first positive lens unit is a positive lens element;

wherein a layer of air is reserved between the positive lens component and the negative meniscus lens component of said first lens unit; and wherein a magnification of said zoom lens system is changed from a wide position to a telephoto position by varying an airspace reserved between said first lens unit and said second lens unit as well as an airspace reserved between said second lens unit and said third lens unit.

12. A zoom lens system comprising in order from an object side:

a first positive lens unit;

a second positive lens unit; and a third negative lens unit, wherein said first positive lens unit comprises a positive lens component which is disposed on the object side, and a negative meniscus lens component which is disposed on an image side of said positive lens component and has a concave surface on the image side, wherein said second positive lens unit comprises at least an aspherical surface which has a shape adapted to strengthen a negative refractive power as portions of the aspherical surface are farther from an optical axis, wherein lens components which have powers in said first positive lens unit comprise a positive lens element and a negative lens element, and wherein a magnification of said zoom lens system is changed from a wide position to a telephoto position by varying an airspace reserved between said first lens unit and said second lens unit as well as an airspace reserved between said second lens unlit and said third lens unit.

13. A zoom lens system comprising in order from an object side:

a first positive lens unit;

a second positive lens unit; and a third negative lens unit, wherein said first positive lens unit comprises a positive lens component which is disposed on the object side, and a negative meniscus lens component which is disposed on an image side of said positive lens component and has a concave surface on the image side, wherein said third negative lens unit comprises in order from the object side, a cemented lens component consisting of an object side part having a refractive power and an image side lens part having, a positive refractive power, and a negative lens component, and wherein a magnification of said zoom lens system is changed from a wide position to a telephoto position by varying an airspace reserved between said first lens unit and said second lens unit as well as an airspace reserved between said second lens unit and said third lens unit.

14. The zoom lens system according to claim 13, wherein said object side lens part of said cemented lens component is configured to have a positive power.

15. A zoom lens system comprising in order from an object side:

a first positive lens unit;

a second positive lens unit; and a third negative lens unit, wherein said first positive lens unit comprises a positive lens component which is disposed on the object side, and a negative meniscus lens component which is disposed on an image side of said positive lens component, and has a concave surface on the image side, wherein said third negative lens unit comprises, in order from the object side, a cemented lens component consisting of an object side lens part having a refractive power and an image side lens part having, a positive refractive power, and a negative lens component, wherein the positive lens component of said first positive lens unit is a positive lens element, and wherein a magnification of said zoom lens system is changed from a wide position to a telephoto position by varying an airspace reserved between said first lens unit and said second lens unit as well as an airspace reserved between said second lens unit and said third lens unit.

16. A zoom lens system comprising in order from an object side:

a first positive lens unit;

a second positive lens unit; and a third negative lens unit, wherein said first positive lens unit comprises a positive lens component which is disposed on the object side, and a negative meniscus lens component which is disposed on an image side of said positive lens component and has a concave surface on the image side, wherein said third negative lens unit comprises, in order from the object side, a cemented lens component consisting of an object side lens part having a refractive power and an image side lens part having a positive refractive power, and a negative lens component, wherein a magnification of said zoom lens system is changed from a wide position to a telephoto position by varying an airspace reserved between said first lens unit and said second lens unit as well as an airspace reserved between said second lens unit and said third lens unit, and wherein the negative lens component of said first lens unit satisfies the following condition(1):

$$1<(r_{2F}+r_{2R})/(r_{2F}-r_{2R})<6 \qquad (1)$$

wherein the reference symbols $r_{2F}$ and $r_{2R}$ represent radii of curvature on the object side surface and the image side surface of the negative lens component of the first lens unit.

17. The zoom lens system according to claim 10, wherein said third lens unit comprises, in order from the object side, a cemented lens component consisting of an object side lens part having a positive refractive power and an image side lens part, and a negative lens component.

18. The zoom lens system according to claim 15 or 16, wherein said object side lens part of said cemented lens component is configured to have a positive power.

19. The zoom lens system according to claim 13, wherein said third lens unit comprises at least an aspherical surface which has such a shape as to weaken a negative power as portions of the aspherical surface are farther from the optical axis.

20. The zoom lens system according to claim 13, wherein the object side lens part of said cemented lens component in said third lens unit is made of a resin material.

21. The zoom lens system according to claim 20, wherein the image side lens part of said cemented lens component in said third lens unit is made of a glass material.

22. The zoom lens system according to claim 20, wherein the object side lens part of the cemented lens component in said third lens unit has an object side aspherical surface.

23. The zoom lens system according to claim 22, wherein the object side lens part of the cemented lens component in said third lens unit has a negative refractive power in the vicinity of the optical axis and a positive refractive power at a marginal portion thereof.

24. The zoom lens system according to claim 22, satisfying the following condition (2):

$$-35 < v_{db} - v_{da} < -5 \qquad (2)$$

wherein the reference symbols $v_{da}$ and $v_{db}$ represent Abbe's numbers of the object side lens part and the image side lens part respectively of the cemented lens component in the third lens unit.

25. The zoom lens system according to claim 20, satisfying the following condition (3):

$$|\phi_a|/\phi_T < 0.9 \qquad (3)$$

wherein the reference symbol $\phi_a$ represents a refractive power of the object side lens part of the cemented lens component which is located on the optical axis and the reference symbol $\phi_T$ designates a refractive power of the zoom lens system as a whole at the telephoto position, when the lens part made of the resin material has an aspherical surface, its refractive power has a value which is calculated on the basis of a value of a surface having a radius of curvature on a standard surface on the optical axis (a reference sphere).

26. The zoom lens system according to claim 24 satisfying the following condition (4):

$$0.8 < t_2/t_1 < 1.5 \qquad (4)$$

wherein the reference symbol $t_1$ represents a thickness of the lens element made of the resin material as measured on the optical axis and the reference symbol $t_2$ designates a thickness of the lens element at a maximum height of an axial marginal ray at the telephoto position of the zoom lens system.

* * * * *